(12) United States Patent
Parker et al.

(10) Patent No.: US 8,828,128 B1
(45) Date of Patent: Sep. 9, 2014

(54) DESICCANT DEHUMIDIFICATION SYSTEM AND METHOD

(71) Applicant: NovelAire Technologies, L.L.C., Baton Rouge, LA (US)

(72) Inventors: Terry Parker, Baton Rouge, LA (US); Robert Mills, Baton Rouge, LA (US)

(73) Assignee: Novelaire Technologies, L.L.C., Baton Rouge, LA (US)

( * ) Notice: Subject to any disclaimer, the term of this patent is extended or adjusted under 35 U.S.C. 154(b) by 128 days.

(21) Appl. No.: 13/715,849

(22) Filed: Dec. 14, 2012

Related U.S. Application Data

(60) Provisional application No. 61/580,149, filed on Dec. 23, 2011.

(51) Int. Cl.
| | | |
|---|---|---|
| F25D 17/06 | (2006.01) | |
| B01D 53/06 | (2006.01) | |
| F24F 3/14 | (2006.01) | |

(52) U.S. Cl.
CPC .................................. *F24F 3/1423* (2013.01)
USPC .................................. 96/125; 96/127; 96/130

(58) Field of Classification Search
USPC .............. 95/113; 96/125–128, 130, 146, 147; 62/94, 271; 34/80, 472, 473
See application file for complete search history.

(56) References Cited

U.S. PATENT DOCUMENTS

| | | | |
|---|---|---|---|
| 4,180,985 A | 1/1980 | Northrup, Jr. | |
| 4,380,910 A | 4/1983 | Hood et al. | |
| 4,474,021 A | 10/1984 | Harband | |
| 4,719,761 A | 1/1988 | Cromer | |
| 4,926,618 A * | 5/1990 | Ratliff | 95/10 |
| 5,040,375 A | 8/1991 | Von Dobeln | |
| 5,448,895 A | 9/1995 | Coellner et al. | |
| 5,502,975 A | 4/1996 | Brickley et al. | |
| 5,517,828 A | 5/1996 | Calton et al. | |
| 5,732,562 A | 3/1998 | Moratalla | |
| 5,791,153 A | 8/1998 | Belding et al. | |
| 6,029,467 A | 2/2000 | Moratalla | |
| 6,094,835 A | 8/2000 | Cromer | |
| 6,141,979 A | 11/2000 | Dunlap | |
| 6,170,271 B1 | 1/2001 | Sullivan | |

(Continued)

FOREIGN PATENT DOCUMENTS

EP          0191007 A2     8/1986

OTHER PUBLICATIONS

Cromer, Charles J.; "Desiocant Moisture Exchange for Dehumidification Enhancement of Air Conditioners"; Proceedings of the Fifth Symposium on Improving Building Systems in Hot and Humid Climates, Houston, TX, Sep. 12-14, 1988.
Dectron, Inc. brochure; Series DA2 Ice Rink; Aug. 1993.

(Continued)

*Primary Examiner* — Frank Lawrence
(74) *Attorney, Agent, or Firm* — Jones Walker LLP

(57) ABSTRACT

A system and method for controlling the humidity of an indoor space is disclosed. The system features a desiccant wheel which rotates sequentially through a plurality of distinct process air streams in order to optimize desiccant moisture adsorption at the process side of the desiccant wheel. This moisture is then deposited on the regeneration side of the wheel upstream of a cooling coil, increasing the dew point of the air entering the coil. The latent capacity and operational temperature of the coiling coil will be increased as a result, thus enhancing the dehumidification performance of the cooling coil and the overall efficiency of the system.

14 Claims, 17 Drawing Sheets

(56) References Cited

U.S. PATENT DOCUMENTS

| | | | |
|---|---|---|---|
| 6,199,388 B1 | 3/2001 | Fischer, Jr. | |
| 6,235,086 B1 | 5/2001 | Fujimura | |
| 6,237,354 B1 | 5/2001 | Cromer | |
| 6,308,525 B1 | 10/2001 | Ike et al. | |
| 6,355,091 B1 * | 3/2002 | Felber et al. | 95/10 |
| 6,408,932 B1 | 6/2002 | Steele et al. | |
| 6,527,836 B1 * | 3/2003 | White et al. | 96/113 |
| 6,557,365 B2 | 5/2003 | Dinnage et al. | |
| 6,711,907 B2 | 3/2004 | Dinnage et al. | |
| 6,973,795 B1 | 12/2005 | Moffitt | |
| 7,017,356 B2 | 3/2006 | Moffitt | |
| 7,047,751 B2 | 5/2006 | Dinnage et al. | |
| 7,178,355 B2 | 2/2007 | Moffitt | |
| 7,217,313 B2 * | 5/2007 | Motono et al. | 95/113 |
| 7,340,906 B2 | 3/2008 | Moffitt | |
| 7,389,646 B2 | 6/2008 | Moffitt | |
| 7,654,101 B2 * | 2/2010 | Shapiro | 62/260 |
| 7,685,834 B2 | 3/2010 | Moffitt | |
| 8,328,904 B2 * | 12/2012 | Griffiths et al. | 95/10 |
| 2007/0028769 A1 * | 2/2007 | Eplee et al. | 95/113 |
| 2012/0068119 A1 * | 3/2012 | Kametani et al. | 252/372 |

OTHER PUBLICATIONS

Mumma, Stanley A., Ph.D., P.E.; "Dedicated Outdoor Air-Dual Wheel System Control Requirements"; Ashrae Transactions 2001, V. 107, Pt. 1.

Power Point Presentation "CDQ—What is it?"; American Standard Inc. 2004.

Seibu Giken Co., LTD.; DST Sorption Technics; "Dehumidification of Air" Brochure. Nov. 2012.

DST Seibu Giken brochure "Dehumidifier Flexisorb Econosorb/Frigosorb" Nov. 2012.

DST Seibu Giken brochure "Dehumidifier Flexisorb Recusorb/Consorb" Nov. 2012.

IR Ingersoll Rand Trane brochure "Dehumidification solutions Effective moisture removal for indoor environments" 2010.

IR Ingersoll Rand Trane Engineering Bulletic "CDG$^{tm}$ Desiccant Dehumidification Cool Dry Quiet" CLCH-PRB020-EN 2010.

Murphy, J., and Brenda Bradley. "Advances in desiccant-based dehumidification." Trane Engineers Newsletter 34.4 2005.

Munters Corporation brochure "Munters is the NHL Preferred Supplier of Deisccant Dehumidification Systems" 2006.

CDIMS brochure "Arid-Ice™ Advanced Reactive Drying, Meeting NHL Standards for Large Spectator Ice Arenas." Nov. 2012.

International Ice Hockey Federation, "Technical Guidelines of an ice rink, Chapter 3" 2011.

Apogee Interactive, Inc., "Desiccant Systems" Nov. 2012.

Wikipedia "Thermal Wheel" definition, Nov. 2012.

Wikipedia "Dehumidifier" definition, Nov. 2012.

Wikipedia "Relative humidity" Nov. 2012.

Oak Ridge National Laboratory "Desiccants: Because it's not the heat, it's the humidity" Apr. 1999.

DST Seibu Giken "Adsorption dehumidifiers" Peter Andres, Jan. 2, 2002.

* cited by examiner (Rear)

(Front)

DESICCANT DEHUMIDIFICATION SYSTEM AND METHOD

I. BACKGROUND

Insufficient dehumidification in indoor facilities can lead to the deterioration of building materials as well as cause serious moisture-related health issues. Conventional HVAC systems utilize mechanical refrigeration to achieve both sensible and latent cooling. Latent cooling (i.e., dehumidification) occurs when the air is passed over a cooling coil, thereby lowering the air temperature below the entering dew point and causing a portion of the moisture in the air to condense on the coil's surface and drop out of the airflow.

Mechanical refrigerative dehumidification is most effective when the air is at higher temperatures and the relative humidity approaches 100%. However, the latent cooling efficiency of mechanical refrigeration diminishes in low relative humidity environments. In such dry conditions, the air temperature must be cooled below the entering dew point in order to remove moisture from the air. The resulting cold air then must be reheated to avoid over-cooling the space, thereby increasing energy use. Additionally, in subfreezing dew point applications such as ice rink arenas, periodic defrosting cycles are necessary due to ice accumulation on the cooling coils.

Desiccant wheels have been incorporated into air handling systems to replace or enhance the dehumidification performance of mechanical refrigerative dehumidification. Unlike mechanical refrigeration which relies upon cooling the air below its dew point, desiccant dehumidification relies on adsorption. Moisture transfer by the desiccant is driven by the difference in relative humidity of the "process" and "regeneration" air streams. When the relative humidity of the regeneration air stream is lower than the relative humidity of the process air stream, the desiccant will adsorb moisture from the process air stream and transfer it to the regeneration air stream.

Desiccant dehumidification systems are typically designed in either dual-path or single-path configurations depending on the application. A schematic illustration of a conventional dual-path desiccant dehumidification system is shown in FIG. 1. In the dual-path configuration, two counter-current air streams power the operation of the desiccant dehumidification system. The desiccant wheel rotates through these two air streams and transfers moisture from the higher relative humidity process air stream to the lower relative humidity regeneration air stream. Because the relative humidity of the air leaving the process side of the wheel can only get as low as the relative humidity of the air entering the regeneration side of the wheel, a heat source is typically utilized to heat the regeneration air stream to lower its relative humidity. Typical heat sources include direct-fired gas heaters, electric heaters, and indirect heat sources such as steam, hot water, solar, and waste heat from the building. Depending on the targeted indoor conditions, regeneration air temperatures usually range from 100° F. to 300° F., which in turn raises the dry-bulb temperature of the process air leaving the desiccant wheel. Accordingly, most dual-path systems include a cooling coil downstream of the process side of the wheel to re-cool the air before supplying it to the conditioned space.

A schematic illustration of a conventional single-path desiccant dehumidification system is shown in FIG. 2. These systems are sometimes referred to as "Cromer Cycle" systems. Single-path desiccant dehumidification systems are designed to enhance the dehumidification performance of a traditional cooling coil in applications which would otherwise be difficult and expensive to maintain using mechanical refrigeration alone. In such systems, moisture transfer occurs within a single air stream. The desiccant wheel is configured in series with a cooling coil such that the regeneration side of the wheel is located upstream of the coil and the process side of the wheel is located downstream of the coil. The air downstream of the cooling coil will be at a very high relative humidity as it enters the process side of the desiccant wheel. The desiccant wheel will adsorb moisture from the saturated air downstream of the coil and deposit it back into the air upstream of the coil. This moisture will then be removed from the air by the coil via condensation. The addition of the desiccant wheel to the conventional mechanical refrigeration system enhances the dehumidification performance of the traditional cooling coil by increasing the latent capacity of the cooling coil without increasing its total cooling capacity. And, unlike a conventional mechanical refrigeration system with a cooling coil alone, the supply air dew point can be lower than the coil surface temperature.

In certain applications, single-path desiccant dehumidification systems are capable of providing significant energy savings over dual-path desiccant dehumidification systems. Unlike dual-path systems, single-path systems typically do not require an external heat source to regenerate the desiccant wheel. Further, post-cooling may not be necessary with single-path systems, whereas the process air stream in dual-path systems oftentimes must be re-cooled before it's supplied to the conditioned space.

A shortcoming of current-generation single-path desiccant systems, however, is the inability to drastically reduce moisture content from the processed air. Further, the effectiveness of current generation single-path systems is significantly diminished in applications where the air entering the system has a high relative humidity. This is only exacerbated where the incoming air has a low temperature in addition to high relative humidity. In such conditions, periodic defrosting cycles may be necessary due to frost buildup on the coils. As a result, dual-path systems are still predominately used in low dew point applications such as ice rink arenas despite their high energy usage per pound of water removed.

II. SUMMARY

A system and method for controlling the humidity of an indoor space is described herein. The system features a desiccant wheel which rotates sequentially through a plurality of distinct process air streams in order to optimize desiccant moisture adsorption at the process side of the wheel. The rotation of the desiccant wheel sequentially through the plurality of distinct process air streams allows the system to efficiently produce supply air having a lower relative humidity than that achievable by conventional single-path desiccant wheel systems. The system is also capable of maintaining a higher operational cooling coil temperature due to the increased latent load supplied at the cooling coil. This not only improves the COP (coefficient of performance) of the system's refrigeration system, but also eliminates the need for defrost cycles (and the accompanying defrost cycle components) in subfreezing dew point applications. Furthermore, because the system allows the entire latent load to be decoupled from the building's conventional cooling system, the conventional cooling system can be downsized to handle only the sensible load of the building.

The above summary is not intended to describe each illustrated embodiment or every possible implementation. These and other features, aspects, and advantages of the present invention will become better understood with regard to the following description, appended claims, and accompanying drawings.

III. BRIEF DESCRIPTION OF THE DRAWINGS

FIG. 5b is a psychrometric chart showing the performance of the dehumidification system depicted in FIG. 5a.

FIG. 12b is a psychrometric chart showing the performance of the dehumidification system depicted in FIG. 12a.

FIG. 13b is a psychrometric chart showing the performance of the dehumidification system depicted in FIG. 13a.

IV. DESCRIPTION

Figure 1:
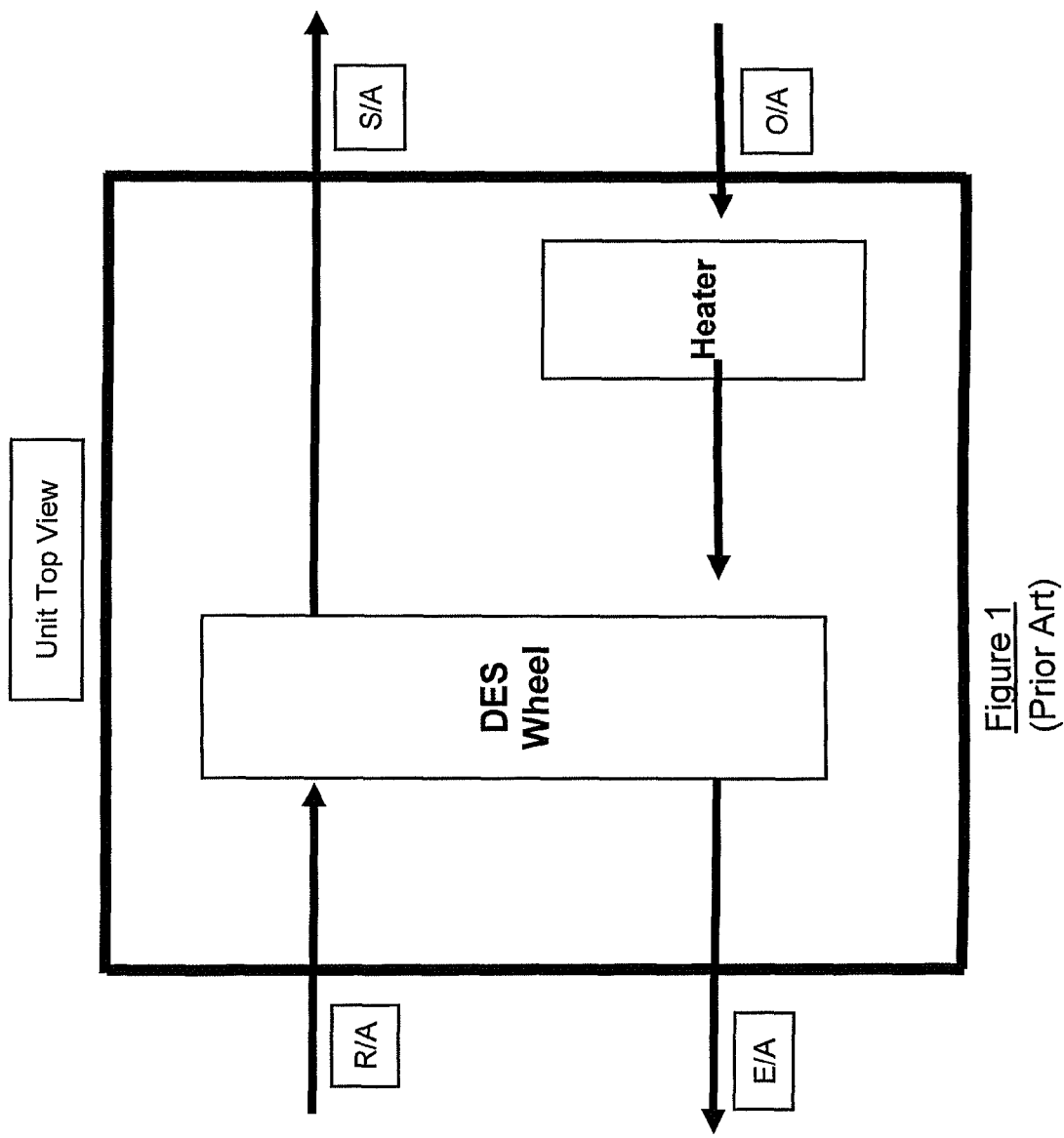
FIG. 1 is a schematic view of a conventional dual-path desiccant dehumidification system.
Figure 2:
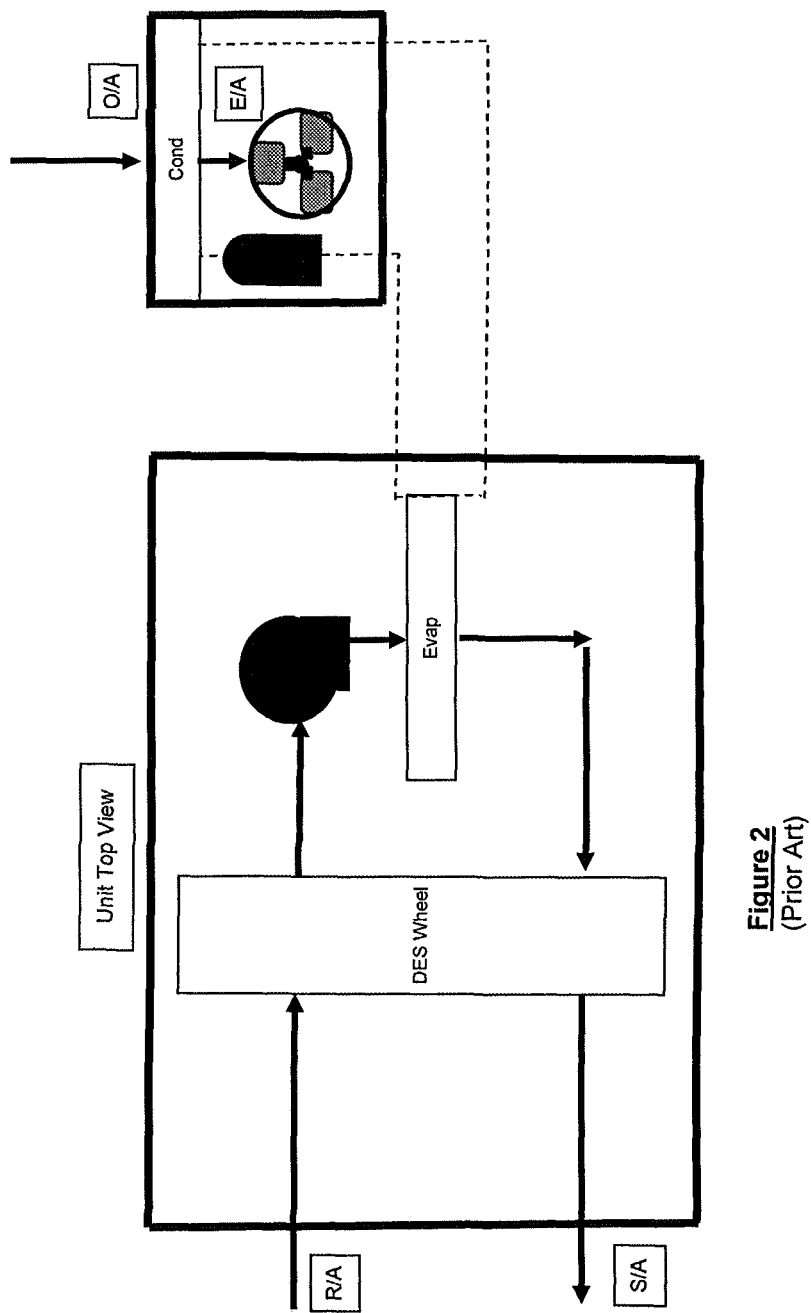
FIG. 2 is a schematic view of a conventional single-path desiccant dehumidification system.

The description which follows, and the embodiments described therein, is provided by way of illustration of examples of particular embodiments of principles and aspects of the present invention. These examples are provided for the purposes of explanation—and not of limitation—of those principles of the invention. In the description that follows, like parts are marked throughout the specification and the drawings with the same respective reference numerals.

Figure 3:
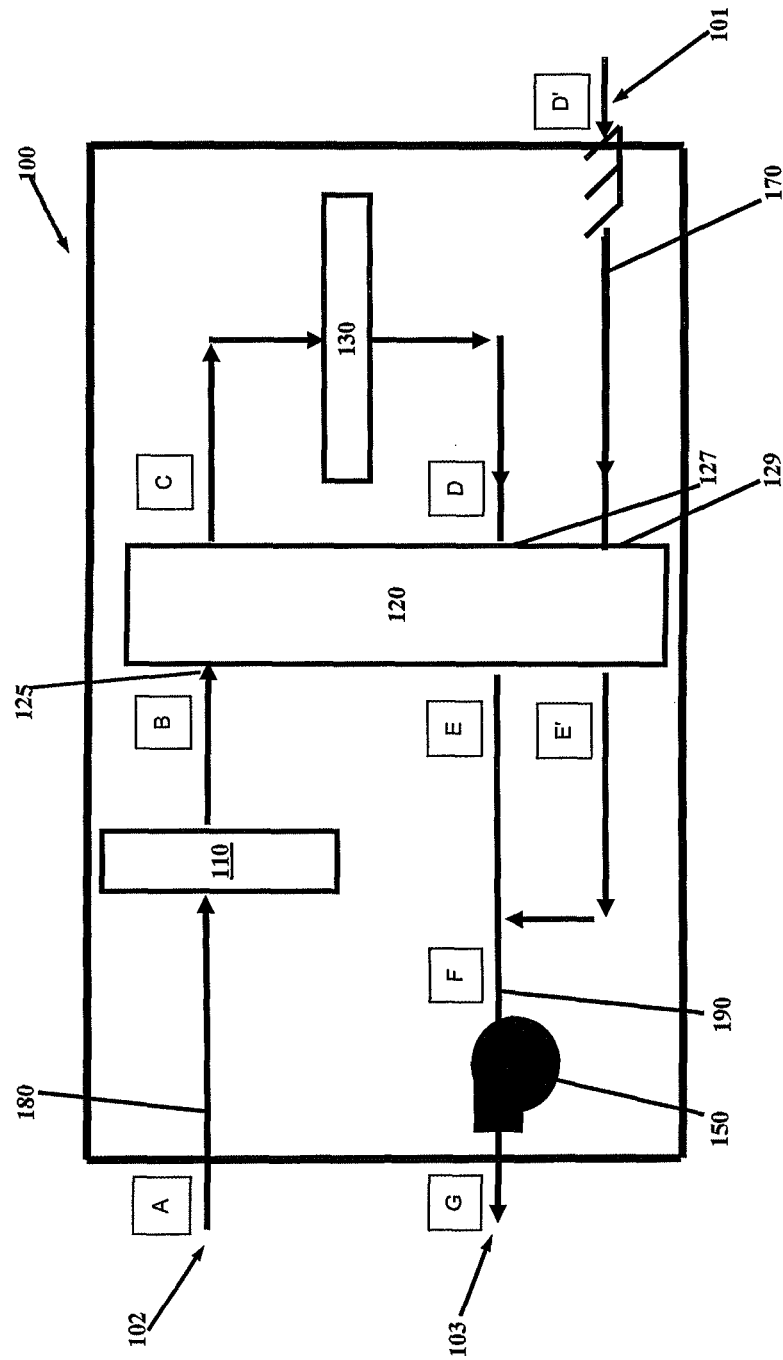
FIG. 3 is a schematic view of an embodiment of the dehumidification system of the present invention.

A system embodying features of the present invention is shown schematically in FIG. 3. The system 100 comprises an means for creating a first air stream 101 and a second air stream 102 (e.g., an air supplier 150); a heating means 110 positioned within the second air stream 102 for heating the air; a cooling means 130 positioned within the second air stream 102 for cooling and dehumidifying the second air stream 102; a desiccant wheel unit 120 having its regeneration side positioned in the second air stream 102 between the heating means 110 and the cooling means 130 and having its process side positioned partially in the second air stream 102 and partially in the first air stream 101 in order to allow the desiccant wheel system 120 to transfer moisture from the first air stream 101 and the process portion (i.e., the portion between Points D-E) of the second air stream 102 into the regeneration portion (i.e., the portion between Points A-C) of the second air stream 102.

The heating means 110 can comprise any means capable of raising the dry-bulb temperature of the air entering the system, including but not limited to direct heat sources (e.g., gas or electric heaters) or indirect heat sources (e.g., steam, hot water, solar, and waste heat from the building). The cooling means 130 can comprise chilled water, cooling coils, or any other means capable of dehumidifying a passing air stream. In a preferred embodiment described below, a vapor-compression refrigeration system (DX system) is utilized, with the condenser serving as the heating means 110 and the evaporator coil serving as the cooling means 130.

The means for creating the first air stream 101 and the second air stream 102 can be one or more air suppliers 150 such as fans, blowers, or any other means capable of moving air so as to create an air stream. In the embodiment depicted in FIG. 3, the air supplier 150 is shown positioned along the supply passageway 190. This positioning allows a single air supplier 150 to be used to create both the first and second air streams 101, 102. However, in alternative embodiments, a first air supplier 150 can be positioned in the cycle passageway 180 and a second air supplier 150 can be positioned in either the bypass passageway 170 or the supply passageway 190. The air supplier(s) may be located within the system itself or can be positioned externally to the system and connected by ductwork. The first and second air streams 101, 102 can comprise return air (i.e., air drawn from the conditioned space), outdoor air (i.e., air drawn from the atmosphere), or a mixture of return air and outside air.

Figure 4B:
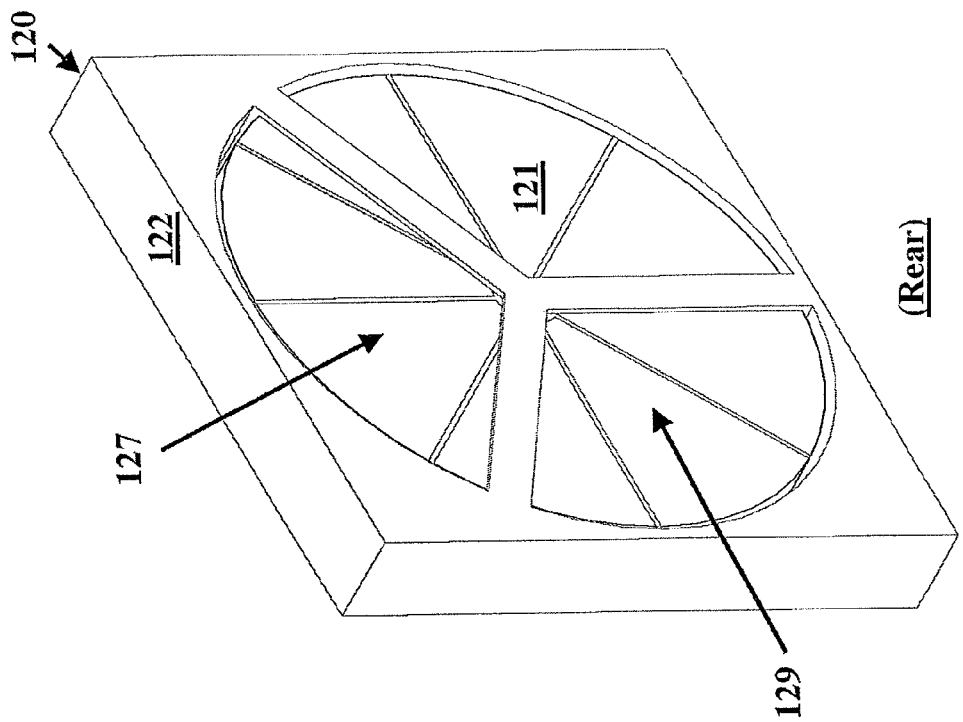
FIG. 4b is a rear perspective view of an exemplary desiccant wheel unit which may be utilized in the present invention.
Figure 4A:
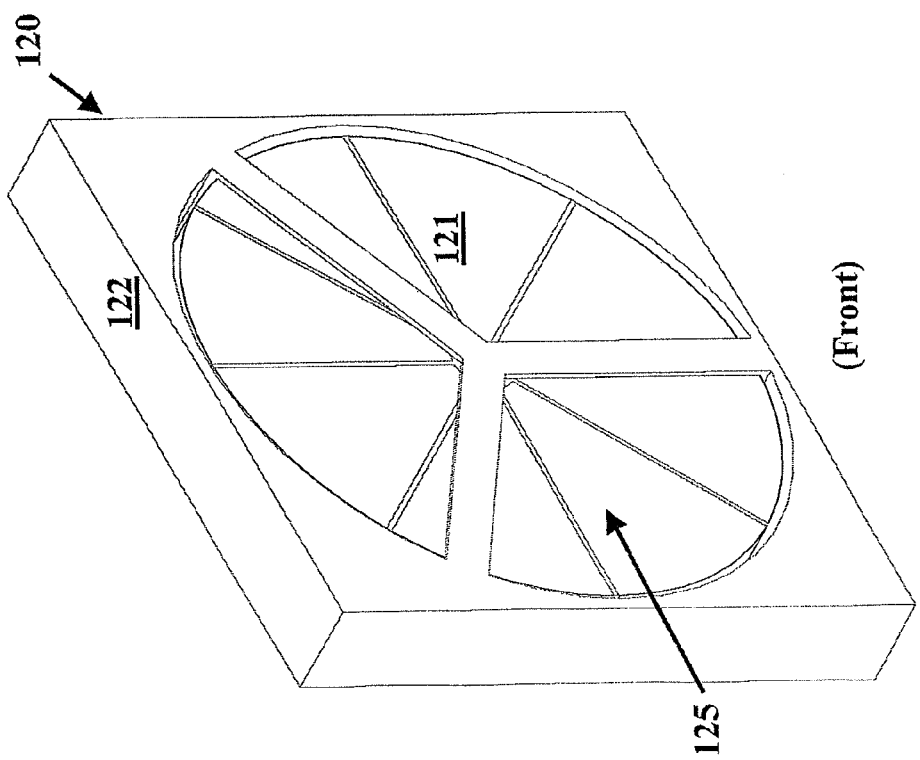
FIG. 4a is a front perspective view of an exemplary desiccant wheel unit which may be utilized in the present invention.

The desiccant wheel unit 120 preferably comprises a rotating desiccant wheel 121 rotatably mounted within a cassette cabinet 122 (See FIGS. 4a and 4b). Preferably, the cassette cabinet 122 is partitioned into three sections to define a regeneration section and two process sections of the desiccant wheel 121. The "regeneration side" or "regeneration section" of the desiccant wheel 121 is that portion of the wheel which is exposed to passing air at the regeneration inlet 125 of the cassette cabinet 122. The "first process section" of the desiccant wheel 121 is that portion of the wheel 121 which is exposed to passing air at the first process inlet 127 of the cassette cabinet 122. The "second process section" of the desiccant wheel 121 is that portion of the wheel 121 which is exposed to passing air at the first second inlet 129 of the cassette cabinet 122. Collectively, the first and second process sections comprise the "process side" of the desiccant wheel 121. The regeneration inlet 125 and process inlets 127, 129 of the cassette cabinet 122 can be of varying proportions depending on the application.

The system 100 is configured to transmit two separate air streams through the first and second process inlets 127, 129 of the cassette cabinet 122 so as to allow for sequential adsorption of moisture by the exposed portions of the desiccant wheel 121. The first air stream 101 can be transmitted through a bypass passageway 170, while the second air stream 102 can be transmitted through a cycle passageway 180. The bypass passageway 170 and the cycle passageway 180 are separated by a partition (not shown) so that the first and second air streams 101, 102 do not mix prior to entering the process side of the desiccant wheel 121. This partition may comprise discrete plenums, ducts, or a baffle between the two air streams. Further, the cycle passageway 180 itself may be subdivided into a heating plenum in fluid communication with a cooling plenum. Dampers can be utilized at the inlets 171, 181 of the bypass and cycle passageways to modulate flow through the system 100.

In operation, first and second air streams 101, 102 are drawn into the bypass and cycle passageways 170, 180, respectively, by the air supplier 150. The first air stream 101 enters the inlet 171 of the bypass passageway 170 and then passes through the exposed portion of the desiccant wheel 121 at the first process inlet 127. Meanwhile, the second air stream 102 enters the inlet 181 of the cycle passageway 180 and is heated by the heating means 110, thereby lowering the air's relative humidity. The hot, dry air then passes through the exposed portion of the desiccant wheel 121 at the regeneration inlet 125, regenerating (i.e., drying) the wheel 121. The second air stream 102 will leave the regeneration section of the wheel 121 cooled and saturated. Next, the second air stream 102 passes through the cooling means 130 where it is cooled to its dew point to remove moisture via condensation. The cooled saturated air is then passed through the exposed portion of the desiccant wheel 121 at the second process inlet 129 where the air is heated and dried. The dehumidified first and second air streams 101, 102 are then mixed in the supply passageway 190 before exiting the outlet 191.

The desiccant wheel 121 is configured to rotate in a direction to allow the freshly regenerated section of the wheel 121 to first come into contact with the first air stream 101 before rotating into contact with the process portion of the second air stream 102. Rotating the freshly regenerated section of the wheel 121 sequentially through the first and second air streams 101, 102 provides two significant advantages over current generation single-path desiccant dehumidification systems.

Firstly, the sequential adsorption technique optimizes desiccant moisture adsorption at the process side of the wheel 121. The second air stream 102 will have a relative humidity nearing 100% after it exits the cooling means 130. Therefore, the process portion of the second air stream 102 typically will have a higher relative humidity than the first air stream 101 at the process side of the desiccant wheel 121. Because the desiccant only adsorbs moisture when the surface vapor pressure is lower than that of the passing air, it is necessary for the freshly regenerated section of the wheel 121 to first come into contact with lower relative humidity air stream (the first air stream 101) before rotating into contact with the saturated air stream (second air stream 102). In this configuration, maximum moisture adsorption will be achieved resulting in more water being available for removal at the regeneration side of the desiccant wheel 121. The increased availability of moisture for removal at the regeneration side of the wheel 121 will trade sensible capacity for additional latent capacity, thereby lowering the sensible-to-latent heat ratio of the system 100.

Secondly, the sequential adsorption technique allows the first air stream 101 to function as a heat sink thereby removing excess heat energy from the cycle passageway 180. Further, this allows the adsorption process from the second air stream 102 to be more adiabatic in nature, thus further increasing the overall moisture adsorption by the desiccant wheel at the process side.

Figure 5A:
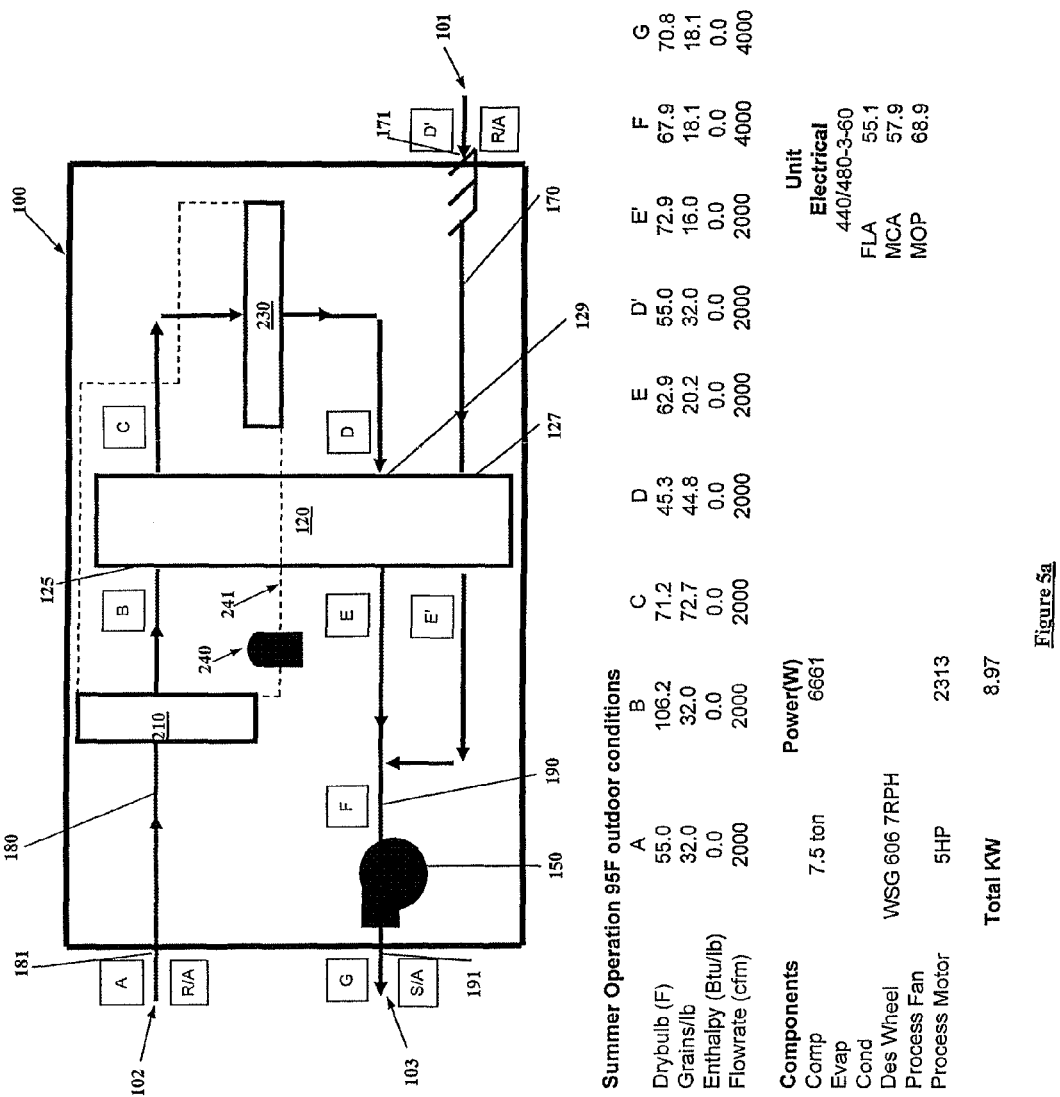
FIG. 5a is a schematic view of an alternative embodiment of the dehumidification system of the present invention.

A preferred embodiment of the system 100 of the present invention is shown schematically in FIG. 5a. In this embodiment, a mechanical refrigeration system is utilized, with the condenser serving as the heating means 110 and the evaporator coil serving as the cooling means 130. The refrigerant cooling system includes a compressor 240 for the liquid/gas refrigerant which is carried in refrigerant lines 241 between a condenser coil 210 and an evaporator coil 230. The compressor 240 preferably is a variable capacity compressor.

By utilizing the waste heat off of the condenser 210 as the heating means used to regenerate the desiccant wheel 121, the efficiency of the system 100 can be optimized. Normally, the placement of a condenser upstream of an evaporator coil in a closed thermodynamic system would cause excess energy to build up in the refrigeration loop, ultimately resulting in the system overheating and failing. However, because the desiccant wheel 121 rotates first through the first air stream 101 and then through the second air stream 102, the first air stream 101 functions as a heat sink allowing excess energy to be removed from the refrigeration loop (the cycle passageway 180) by the first air stream 101.

Rotating the freshly regenerated section of the wheel 121 sequentially through the first and second air streams 101, 102 allows the system 100 to efficiently produce supply air having a lower relative humidity than that achievable by conventional single-path desiccant wheel systems. The system is also capable of maintaining a higher operational cooling coil temperature due to the increased latent load supplied at the evaporator coil. This not only improves the COP (coefficient of performance) of the system's refrigeration system, but also eliminates the need for defrost cycles (and the accompanying defrost cycle components) in subfreezing dew point applications. Furthermore, because the system allows the entire latent load to be decoupled from the building's conventional cooling system, the conventional cooling system can be downsized to handle only the sensible load of the building.

An embodiment of a dehumidification system exemplifying features of the present invention is shown in FIGS. 6-10. The dehumidification system 200 comprises an enclosure 201 divided into plenum sections 202h, 202c, 202b, and 202s by the vertical wall 205 and the intermediate ceiling 207. The compressor 240 and condenser coil 210 are located in heating plenum 202h adjacent to the regeneration section of the desiccant wheel 121. The evaporator coil 230 is located in cooling plenum 202c downstream from the regeneration side of the desiccant wheel 121 and upstream from the second process section of the desiccant wheel 121. The air supplier 150 is located in plenum 202s downstream from the process side of the desiccant wheel 121. In this particular configuration, the desiccant wheel is designed to rotate clockwise relative to the front side of the dehumidification system 200 to allow the freshly regenerated portion of the wheel 121 to first come into contact with the first air stream 101 before rotating into contact with the second air stream 102. The front side of the dehumidification system 200 is demarcated in FIG. 6 with the reference character "X."

In operation, first and second air streams 101, 102 are drawn into the plenum sections 202h and 202b by the air supplier 150. The first air stream 101 flows through plenum 202b, through the first process inlet 127, and then through the first process section of the desiccant wheel 121. Meanwhile, the second air stream 102 flows over the condenser coil 210 located in plenum 202c, heating the second air stream 102 and lowering its relative humidity. The hot, dry air then passes through the regeneration inlet 125 of the cassette cabinet 122, regenerating (i.e., drying) the exposed portion of the wheel 121 while humidifying and cooling the air. Next, the humidified cooled second air stream 102 enters the plenum 202c and passes through the evaporator coil 230 where it is cooled to its dew point to remove moisture via condensation. The second air stream 102—which now consists of cooled, saturated air—is then passed through the second process inlet 129 into the exposed portion of the desiccant wheel 121, heating and further dehumidifying the air. The dehumidified first and second air streams 101, 102 are then mixed in the plenum 202s before exiting the unit 200.

Figure 11:
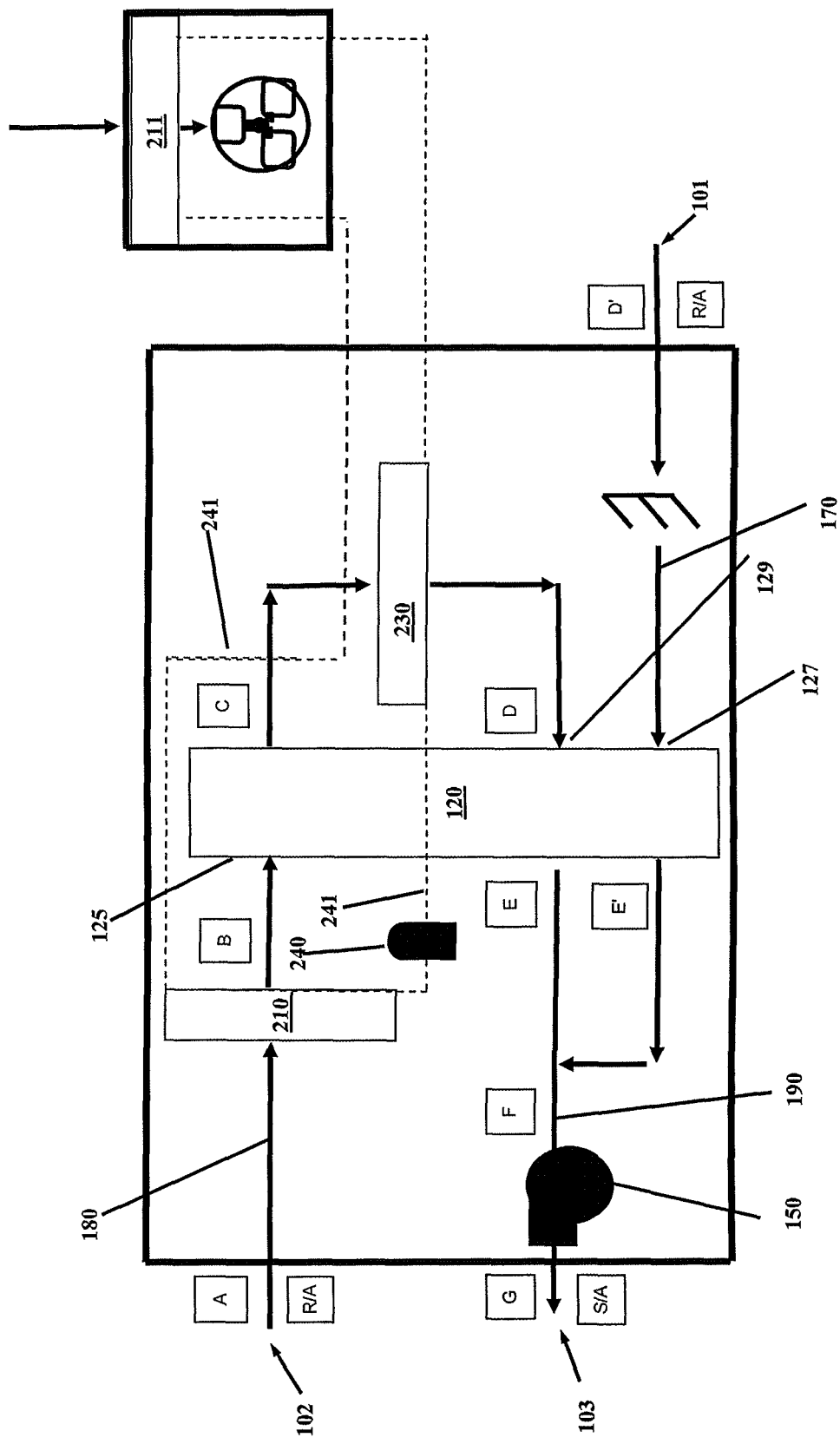
FIG. 11 is a schematic view of an alternative embodiment of the dehumidification system of the present invention.

An alternative embodiment of a dehumidification system having features of the present invention is shown schematically in FIG. 11. In this embodiment, a mechanical refrigeration system is utilized in a similar manner to the embodiment depicted in FIG. 5a. However, in this embodiment, a second external condenser 211 has been added to the refrigeration circuit in order to remove excess heat from the refrigeration loop.

Figure 12A:
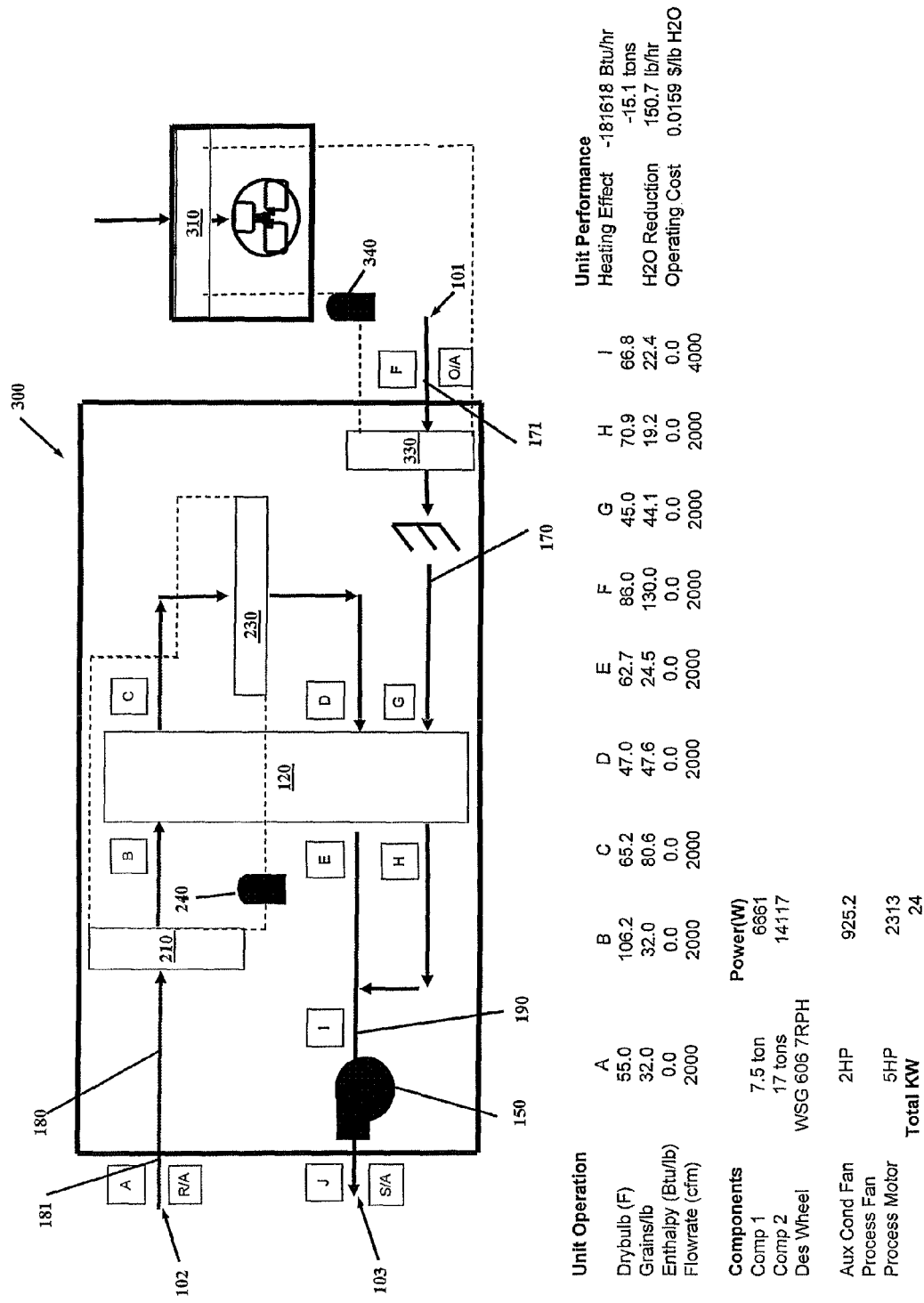
FIG. 12a is a schematic view of an alternative embodiment of the dehumidification system of the present invention.

Another alternative embodiment of the present invention is shown in FIG. 12a. In this embodiment, the system 300 is configured to introduce a mixture of return air and outside air to the conditioned space to address ventilation requirements of the space. Depending on the targeted parameters for the conditioned space and the enthalpy of the outdoor air, it may be necessary to pretreat the outdoor air before transmitting it through the process side of the desiccant wheel 121. In the embodiment depicted in FIG. 12a, a separate refrigeration circuit is utilized to lower the enthalpy of the outdoor air as needed. The refrigeration circuit comprises an evaporator 330, an external condenser 310, and a compressor 340. The performance results of the system are shown in the psychrometric chart depicted in FIG. 12b.

Figure 13A:
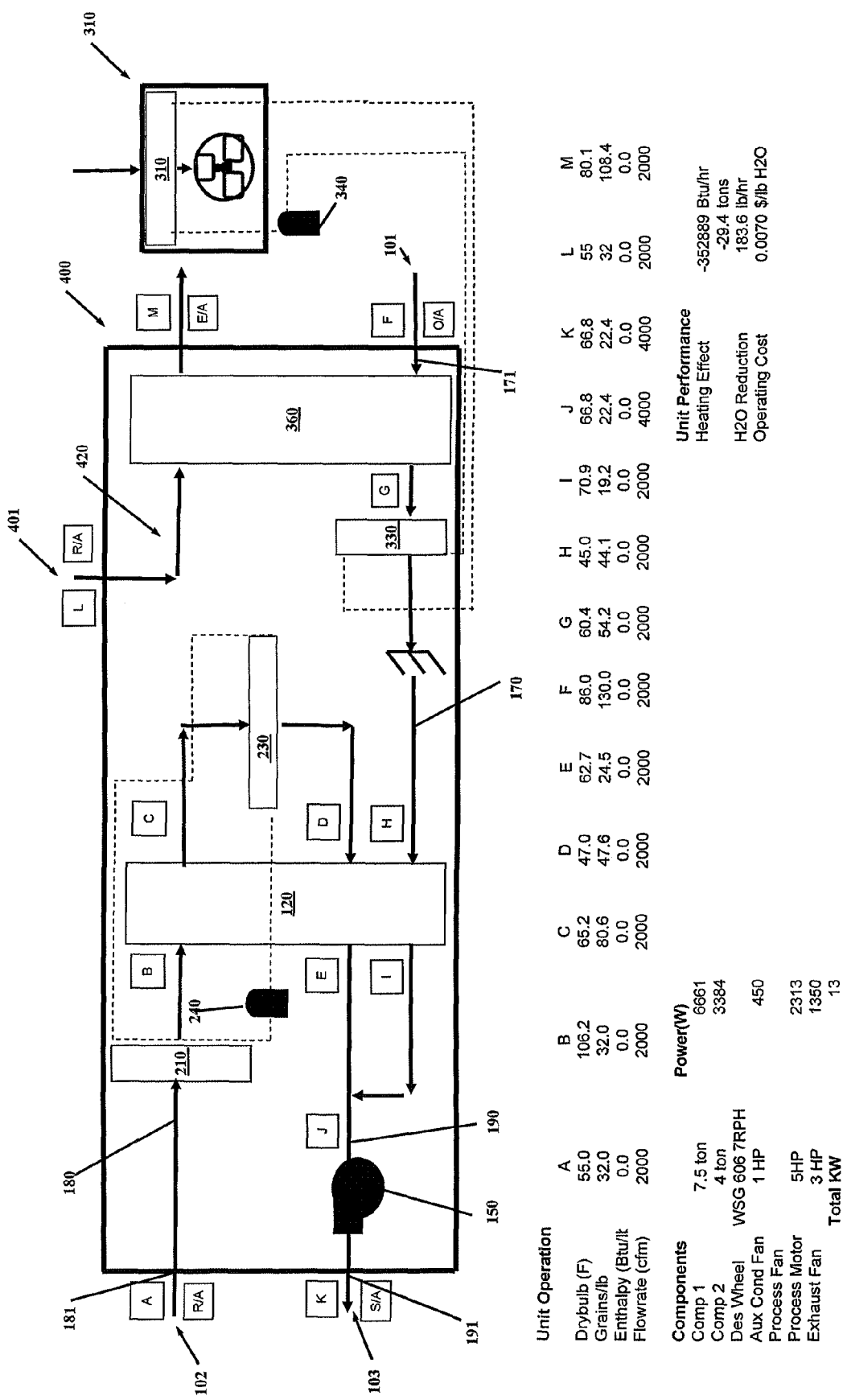
FIG. 13a is a schematic view of an alternative embodiment of the dehumidification system of the present invention.

Another alternative embodiment configured for processing outdoor air is depicted in FIG. 13a. In this embodiment, an enthalpy wheel 360 has been added to the system depicted in FIG. 12a in order to recover energy from the exhaust air and improve the overall energy efficiency of the system. The performance results of the system are shown in the psychrometric chart depicted in FIG. 13b.

EXAMPLES

Due to the ability of the present invention to efficiently produce supply air having a low relative humidity while maintaining a higher operational cooling coil temperature, it is anticipated that the invention will be particularly useful in indoor facilities employing freezing, cooling or refrigeration loads. Such facilities present significant dehumidification challenges due to the combination of a lower ambient temperature and a high moisture load. For instance, in an ice rink facility, the targeted ambient temperature is 60° F. at 40% RH (relative humidity), which equates to a 35° F. dew point. A moisture load is supplied by forced outdoor air ventilation, uncontrolled outdoor air infiltration, the occupants of the facility, evaporating floodwater during ice resurfacing, and the combustion driven ice resurfacer. If the relative humidity within the ice rink facility is not properly maintained, a fog will develop at the ice surface and condensation will form inside the building as well as on the ice sheet. Additionally, high humidity will cause an increased load on the ice refrigeration system resulting in higher energy costs than necessary. Therefore, it is critical that ice rink facilities utilize a dehumidification system capable of creating and maintaining a low humidity environment. As shown in the following examples, it is believed that significant efficiencies will be realized when a dehumidification system embodying the principles of the present invention is utilized as an alternative or supplement to mechanical refrigeration systems in low dew point environments such as ice rink facilities, operating rooms, supermarkets, and the like.

Example 1

Figure 5B:
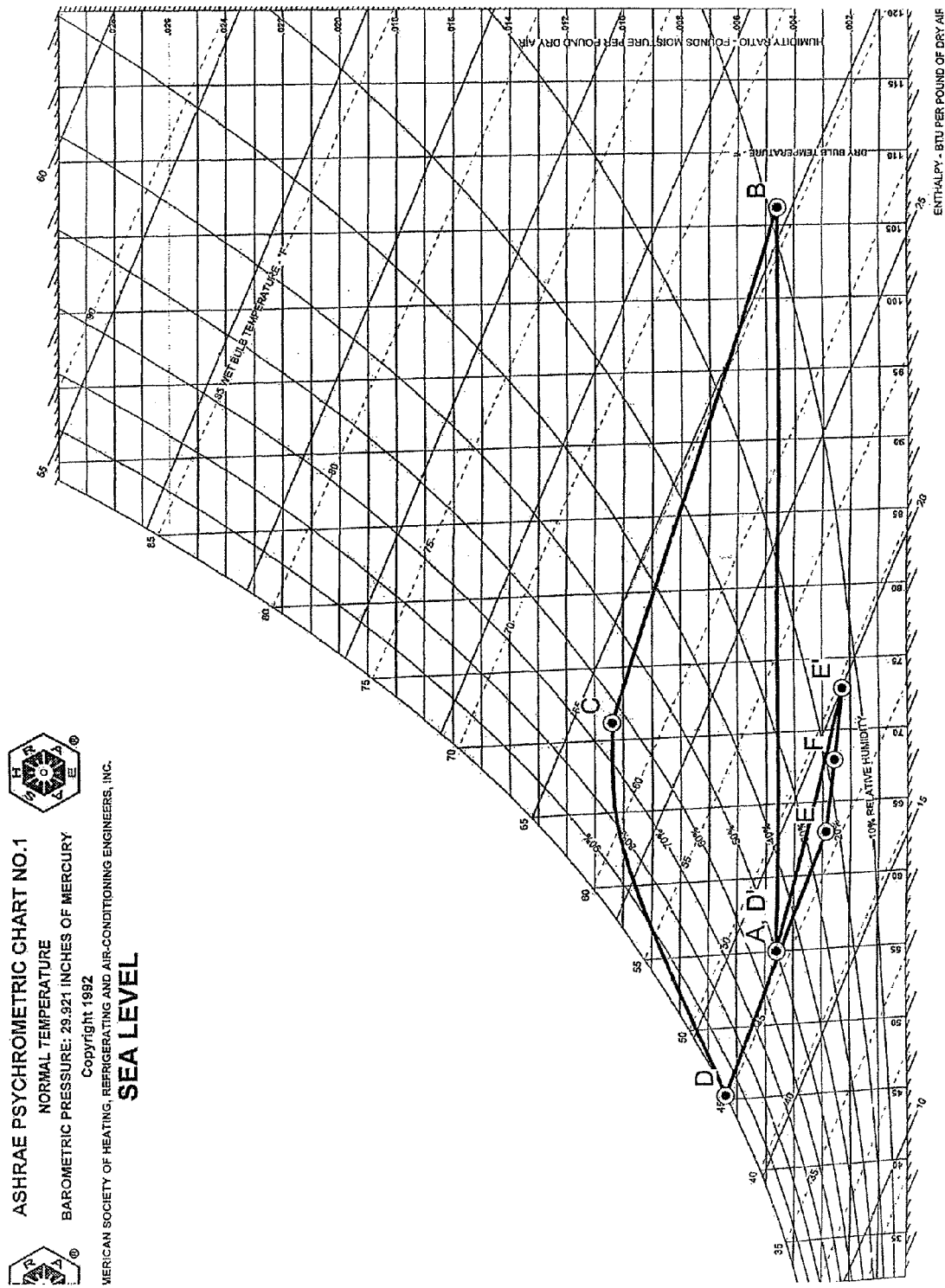
Figure 6:
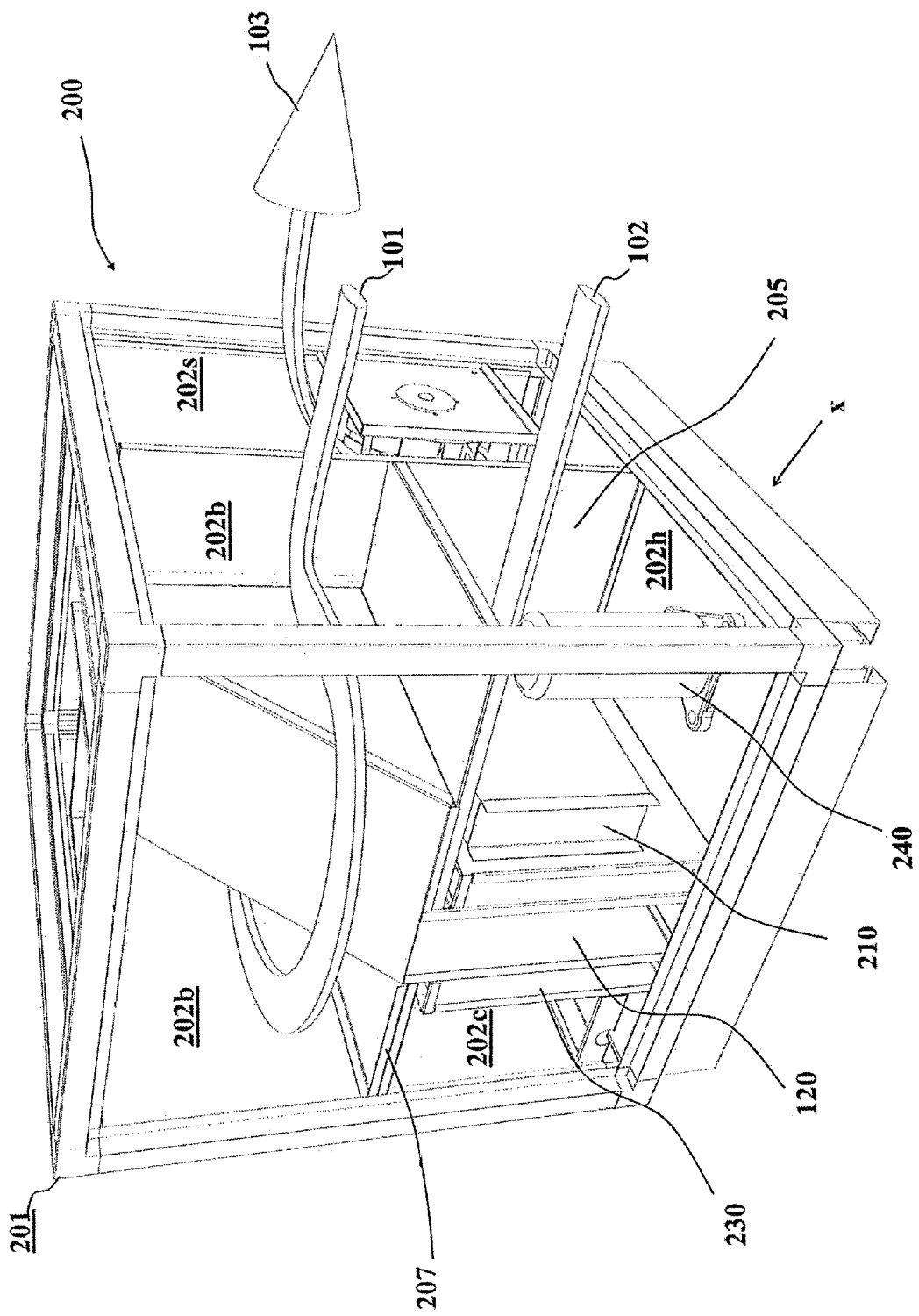
FIG. 6 is a front perspective view of an embodiment of an dehumidification system of the present invention.
Figure 7:
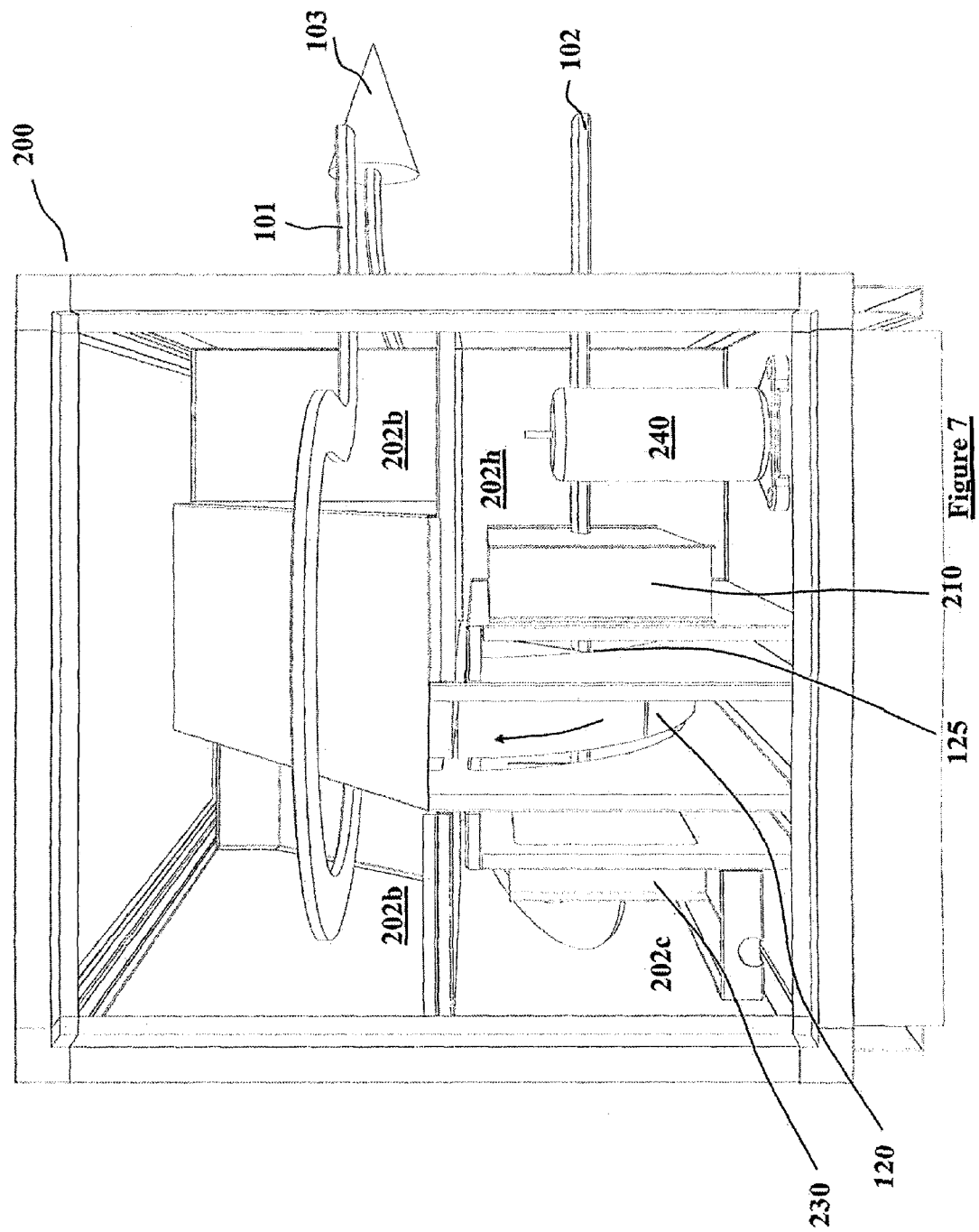
FIG. 7 is a right side view of the dehumidification system depicted in FIG. 6.
Figure 8:
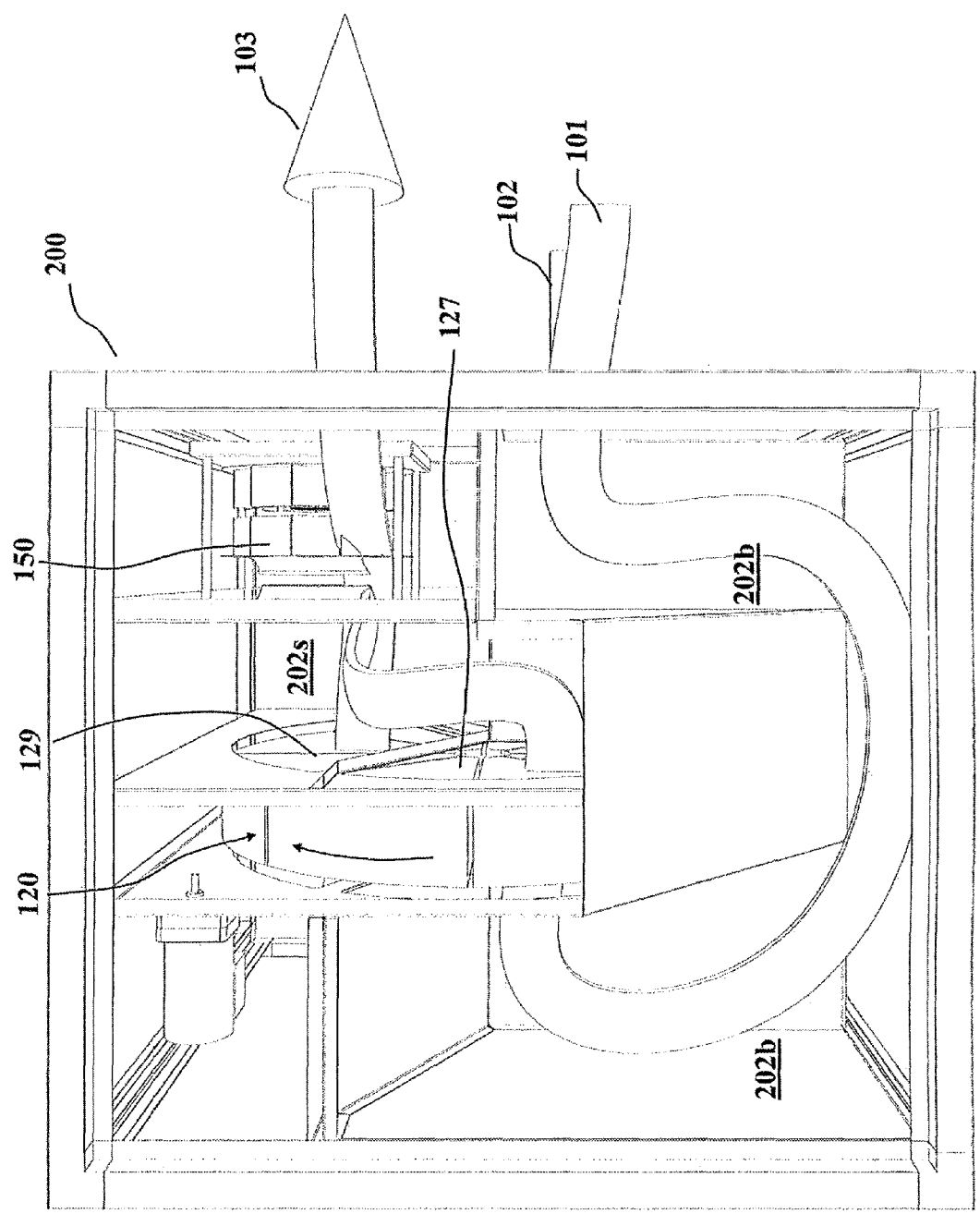
FIG. 8 is a top view of the dehumidification system depicted in FIG. 6.
Figure 9:
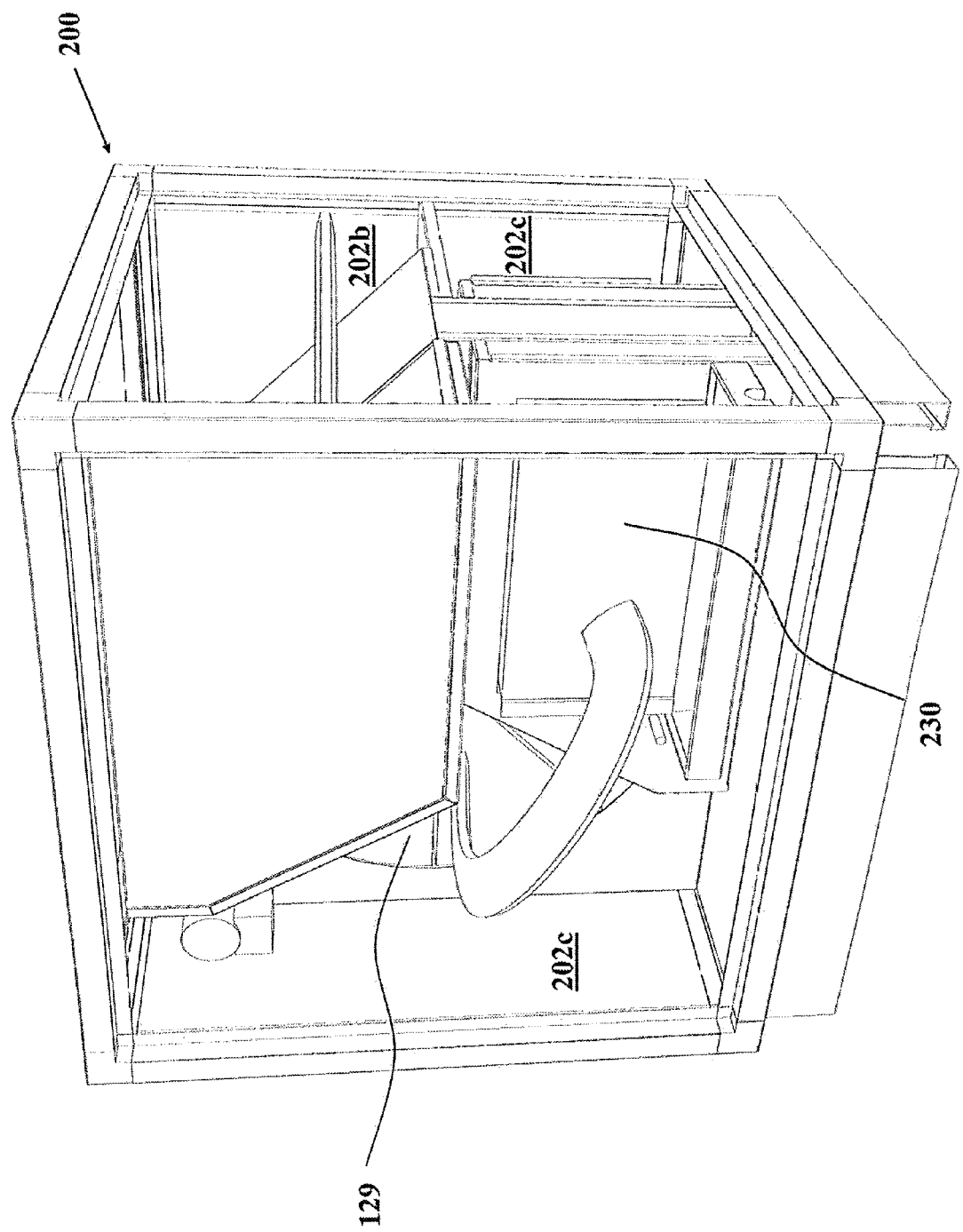
FIG. 9 is a rear perspective view of the dehumidification system depicted in FIG. 6.
Figure 10:
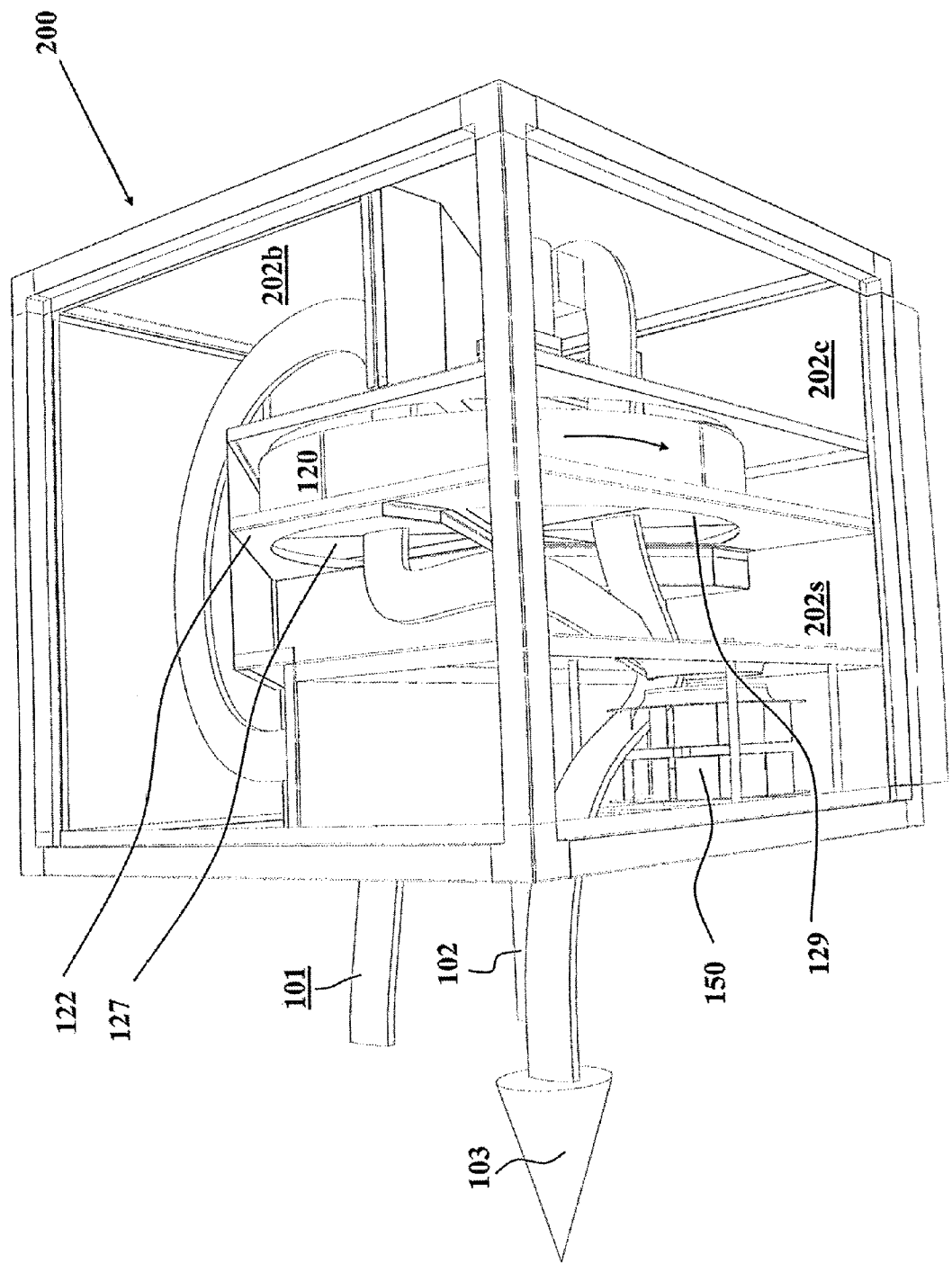
FIG. 10 is a left side perspective view of the dehumidification system depicted in FIG. 6.

Referring to the psychometric chart depicted in FIG. 5b, an example of the performance of the dehumidification system depicted in FIG. 5a is shown. In this example, the system 100 is utilizing a 7.5 ton compressor, a WSG high performance silica gel desiccant wheel rotating at 7 revolutions per hour, and a 5 HP supply fan. Summer operations are presumed with a 95° F. outdoor temperature. The hypothetical conditioned space is in an ice rink facility, where the targeted ambient temperature is 60° F. at 40% RH (relative humidity), which equates to a 35° F. dew point.

Referring to both FIGS. 5a and 5b, first and second air streams 101, 102 having dry-bulb temperatures of 55° F. and moisture contents of 32 grains/lb (Points A and D', respectively) are drawn into the bypass and cycle passageways 170, 180 by the air supplier 150. The second air stream 102 enters the inlet 181 of the cycle passageway 180 and is heated to 106.2° F. and 9.34% RH (Point B) by the condenser 210. The second air stream 102 is then cooled and humidified to 71.2° F. and 63.56% RH (Point C) as the air passes through the regeneration inlet 125 and regenerates the wheel 121. Next, the second air stream 102 passes through the cooling coil 230 where it is cooled to its dew point to remove moisture via condensation. Leaving the cooling coil 230, the second air stream 102 is at 45.3° F. and 99.96% RH with a dew point of 45.29° F. (Point D). Next, the first air stream 101 is heated and dehumidified to 72.9° F. and 13.38% RH with a 21.24° F. dew point (Point E') as it passes through the exposed portion of the desiccant wheel 121 at the first process inlet 127, while the cooled, saturated second air stream 102 is heated and dehumidified to 62.9° F. and 23.81% RH with a 26.14° F. dew point (Point E) as it passes through the exposed portion of the desiccant wheel 121 at the second process inlet 129. The dehumidified first and second air streams 101, 102 are then mixed in the supply passageway 190 (Point F, 67.9° F. and 17.94% RH) before exiting the outlet 191 at 70.8° F. and 16.24% RH with a dew point of 23.82° F. (Point G). Under these parameters, the power consumption of the system is 0.25 Kwh/lb of water removed, with a total moisture extraction of 35.7 lb/hr by the system.

Example 2

Figure 12B:
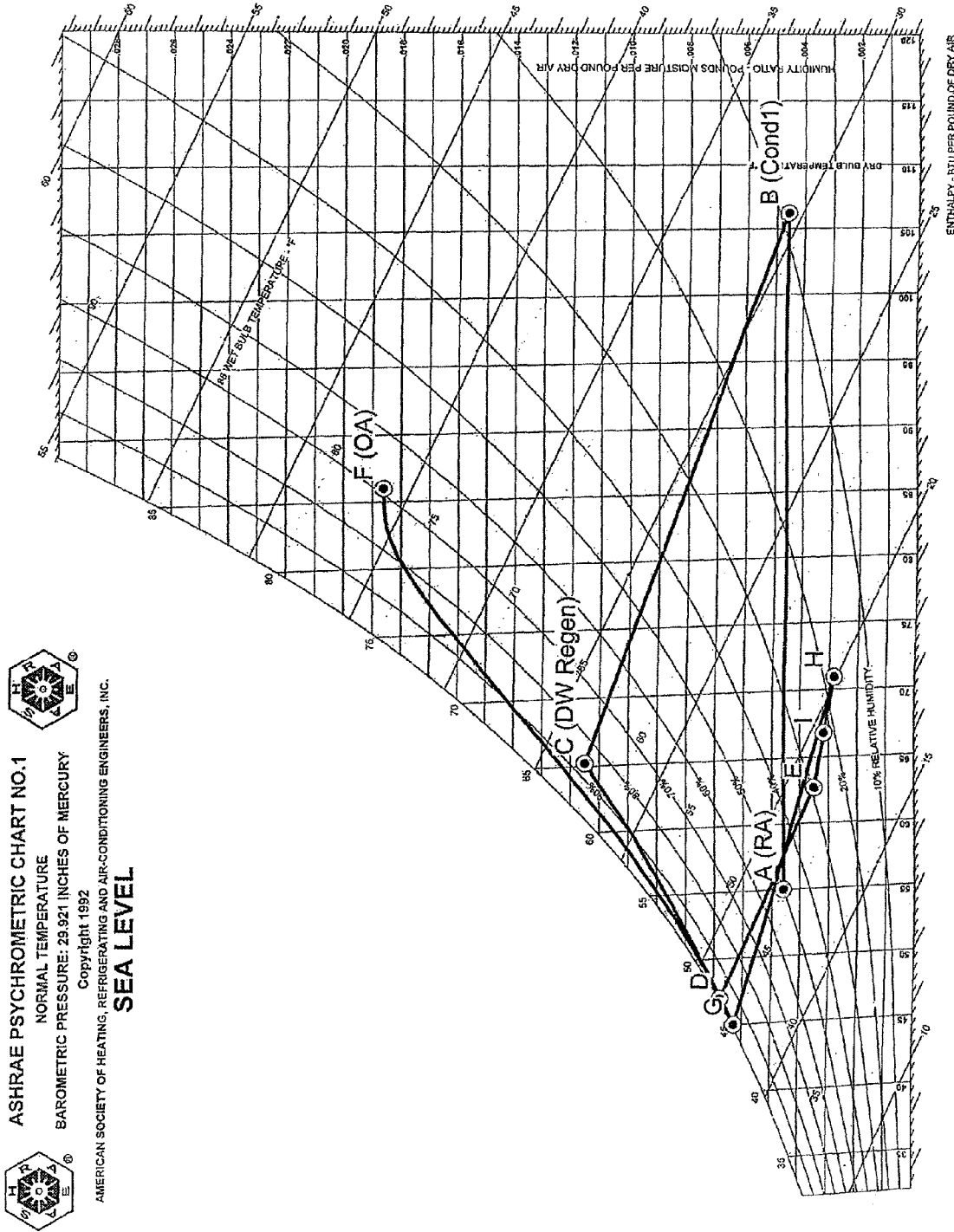

Referring to the psychometric chart depicted in FIG. 12b, an example of the performance of the dehumidification system depicted in FIG. 12a is shown. This system is configured to process both return air and outside air. In this example, the system 100 is utilizing a 7.5 ton compressor 240, a 17 ton compressor 340, a WSG high performance silica gel desiccant wheel rotating at 7 revolutions per hour, and a 5 HP supply fan. Summer operations are presumed with a 95° F. outdoor temperature. The hypothetical conditioned space is in an ice rink facility, where the targeted ambient temperature is 60° F. at 40% RH (relative humidity), which equates to a 35° F. dew point.

Referring to both FIGS. 12a and 12b, the first air stream 101 consisting of outdoor air has a dry-bulb temperature of 86° F. and a moisture content of 130.0 grains/lb (Point F). The second air stream 102 consisting of return air has a dry-bulb temperature of 55° F. and moisture content of 32 grains/lb (Point A). The first and second air streams 101, 102 are drawn into the bypass and cycle passageways 170, 180 by the air supplier 150.

The first air stream 101 enters the inlet 171 of the bypass passageway 170 and passes through the cooling coil 330 to lower the enthalpy of the outside air before processing it through the desiccant wheel 121. Leaving the cooling coil 330, the first air stream 101 is at 45.0° F. and 99.54% RH with a dew point of 44.88° F. (Point G).

The second air stream 102 enters the inlet 181 of the cycle passageway 180 and is heated to 106.2° F. and 9.34% RH (Point B) by the condenser 210. The second air stream 102 is then cooled and humidified to 65.2° F. and 86.46% RH (Point C) as the air passes through the regeneration inlet 125 and regenerates the wheel 121. Next, the second air stream 102 passes through the cooling coil 230 where it is cooled to its dew point to remove moisture via condensation. Leaving the cooling coil 230, the second air stream 102 is at 47.0° F. and 99.52% RH with a dew point of 46.87° F. (Point D).

Next, the first air stream 101 is heated and dehumidified to 70.9° F. and 17.16% RH with a 25.07° F. dew point (Point H) as it passes through the exposed portion of the desiccant wheel 121 at the first process inlet 127, while the second air stream 102 is heated and dehumidified to 62.7° F. and 29.05% RH with a 30.28° F. dew point (Point E) as it passes through the exposed portion of the desiccant wheel 121 at the second process inlet 129. The dehumidified first and second air streams 101, 102 are then mixed in the supply passageway 190. At Point I, the supply air stream is at 66.8° F. and 23.03% RH) with a dew point of 28.35° F. Under these parameters, the power consumption of the system is 0.16 Kwh/lb of water removed, with a total moisture extraction of 150.7 lb/hr by the system 300.

Example 3

Figure 13B:
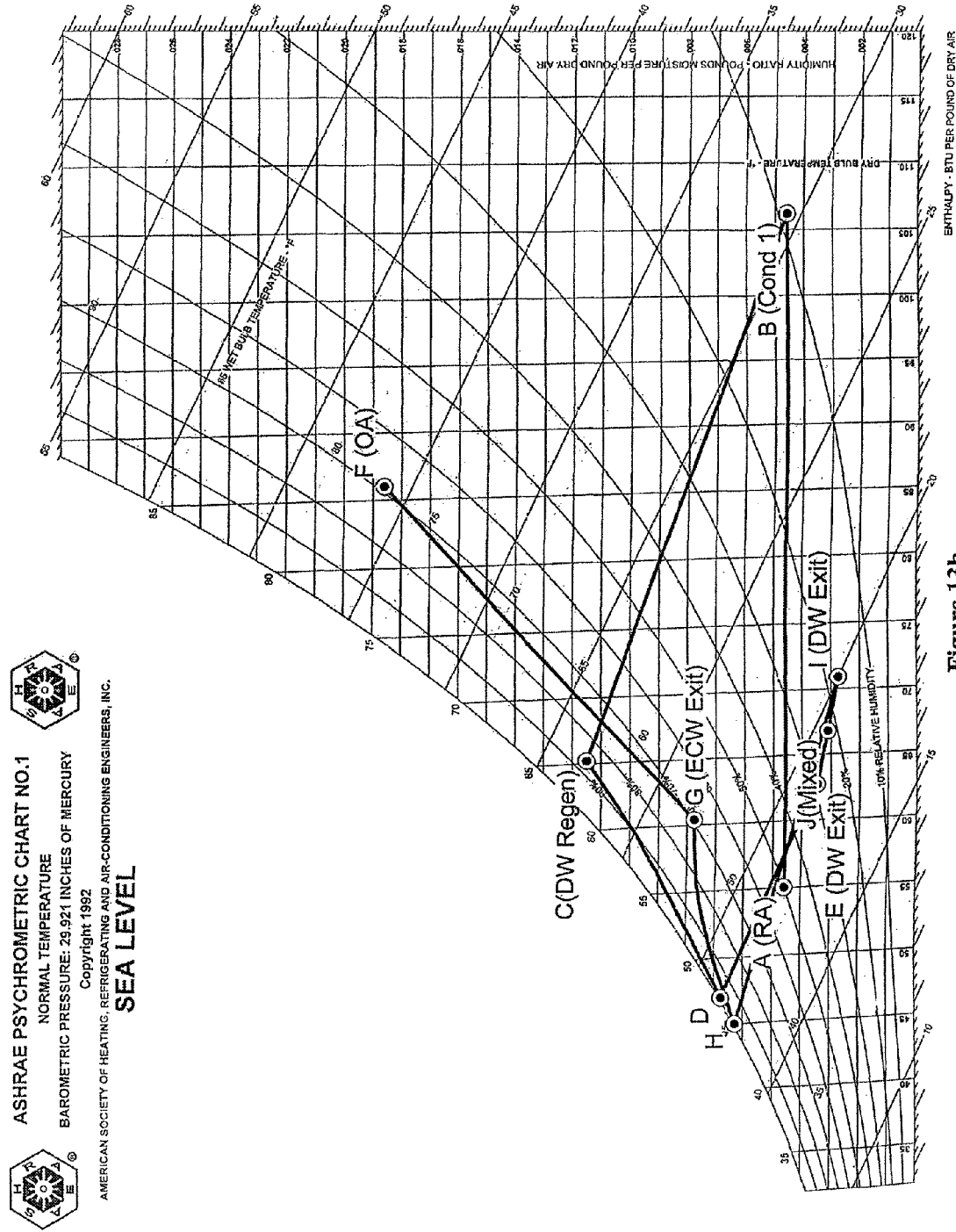

Referring to the psychometric chart depicted in FIG. 13b, an example of the performance of the dehumidification system depicted in FIG. 13a is shown. This particular system features an enthalpy wheel 360 in order to recover energy from the exhaust air and improve the overall energy efficiency of the system. In this example, the system 100 is utilizing a 7.5 ton compressor 240, a 4 ton compressor 340, a WSG high performance silica gel desiccant wheel rotating at 7 revolutions per hour, and a 5 HP supply fan. Summer operations are presumed with a 95° F. outdoor temperature. The hypothetical conditioned space is in an ice rink facility, where the targeted ambient temperature is 60° F. at 40% RH (relative humidity), which equates to a 35° F. dew point.

Referring to both FIGS. 13a and 13b, the first air stream 101 consisting of outdoor air has a dry-bulb temperature of 86° F. and a moisture content of 130.0 grains/lb (Point F). The second air stream 102 consisting of return air has a dry-bulb temperature of 55° F. and moisture content of 32 grains/lb (Point A). The third air stream 401 consists of return air having a dry-bulb temperature of 55° F. and moisture content of 32 grains/lb (Point L).

The third air stream 401 enters the exhaust passageway 420 and passes through the enthalpy wheel 360, absorbing energy. At Point M, the third air stream 401 has a dry-bulb temperature of 80.1° F. and moisture content of 108 grains/lb (69.88% RH).

The first and second air streams 101, 102 are drawn into the bypass and cycle passageways 170, 180 by the air supplier 150. The first air stream 101 enters the inlet 171 of the bypass passageway 170 and passes through the enthalpy wheel 360 and the cooling coil 330 to lower the enthalpy of the air before processing it through the desiccant wheel 121. Leaving the enthalpy wheel 360, the first air stream 101 is at 60.4° F. and 69.26% RH with a dew point of 50.3° F. (Point G). Leaving the cooling coil 330, the first air stream 101 is at 45.0° F. and 99.54% RH with a dew point of 44.88° F. (Point H).

The second air stream 102 enters the inlet 181 of the cycle passageway 180 and is heated to 106.2° F. and 9.34% RH (Point B) by the condenser 210. The second air stream 102 is then cooled and humidified to 65.2° F. and 86.46% RH (Point C) as the air passes through the regeneration inlet 125 and regenerates the wheel 121. Next, the second air stream 102 passes through the cooling coil 230 where it is cooled to its dew point to remove moisture via condensation. Leaving the cooling coil 230, the second air stream 102 is at 47.0° F. and 99.52% RH with a dew point of 46.87° F. (Point D).

Next, the first air stream 101 is heated and dehumidified to 70.9° F. and 17.16% RH with a 25.07° F. dew point (Point I) as it passes through the exposed portion of the desiccant wheel 121 at the first process inlet 127, while the second air stream 102 is heated and dehumidified to 62.7° F. and 29.05% RH with a 30.28° F. dew point (Point E) as it passes through the exposed portion of the desiccant wheel 121 at the second process inlet 129. The dehumidified first and second air streams 101, 102 are then mixed in the supply passageway 190 before exiting the outlet 191 at 66.8° F. and 23.03% RH with a dew point of 28.35° F. (Point K). Under these parameters, the power consumption of the system is 0.07 Kwh/lb of water removed, with a total moisture extraction of 183.6 lb/hr by the system 400.

Example 4

Figure 14:
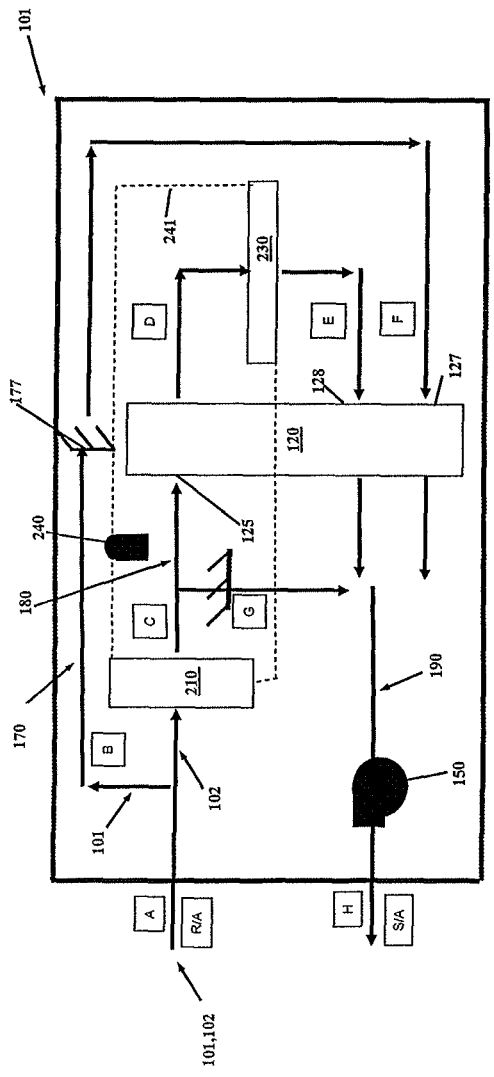
FIG. 14 is a schematic view of an alternative embodiment of the dehumidification system of the present invention.

Another alternative embodiment of the dehumidification system of the present invention is shown schematically in FIG. 14. The air condition system 100 shown in FIG. 14 is similar to the system shown in FIG. 5a, except that a damper 177 has been installed in the bypass passageway 170. When the damper 177 is in the open position, a freshly regenerated section of the desiccant wheel 121 can be rotated sequentially through the first and second air streams 101, 102 to optimize desiccant moisture adsorption at the process side of the desiccant wheel. The performance of the dehumidification system 100 with the damper 177 in the open position is shown in Table 1. The performance of the dehumidification system 100 with the damper 177 in the closed position is shown in Table 2. Under these testing parameters, the efficiency (Kwh/lb $H_2O$) of the dehumidification system 100 increased by 12.5% when the damper 177 was in the open position.

Many modifications and other embodiments of the invention set forth herein will come to mind to one skilled in the art having the benefit of the teaching presented in the foregoing description and associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A dehumidification system, comprising:
   a. a means for creating a first air stream and a second air stream;
   b. a heating means positioned within the second air stream for heating the second air stream;
   c. a cooling means positioned within the second air stream for cooling the second air stream;
   d. a desiccant wheel unit defining a regeneration side and a process side, wherein the regeneration side is positioned in the second air stream between the heating means and the cooling means, and wherein the process side is positioned partially in the second air stream and partially in the first air stream.

2. The dehumidification system of claim 1, wherein the dehumidification system comprises an enclosure having a bypass passageway and a cycle passageway each in fluid communication with a supply passageway, wherein the first air stream is transmitted through the bypass passageway and the second air stream is transmitted through the cycle passageway.

3. The dehumidification system of claim 2, wherein the cycle passageway and bypass passageway are separated by a partition such that the first air stream and the second air stream do not mix prior to entering the process side of the desiccant wheel unit.

4. The dehumidification system of claim 3, wherein the heating means is positioned in the cycle passageway upstream of the regeneration side of the desiccant wheel unit, and wherein the cooling means is positioned in the cycle passageway downstream of the regeneration side of the desiccant wheel unit and upstream of the process side of the desiccant wheel unit.

5. The dehumidification system of claim 4, wherein the heating means is a condenser and the cooling means is an evaporator coil.

6. The dehumidification system of claim 4, wherein the means for creating the first air stream and the second air stream is a blower positioned in the supply passageway.

7. The dehumidification system of claim 4, wherein the means for creating the first air stream and the second air stream is a first blower positioned in the cycle passageway and a second blower positioned in the bypass passageway.

8. The dehumidification system of claim 4, wherein the second air stream defines a regeneration portion and a process portion, and wherein the desiccant wheel is configured to rotate in a first direction such that a freshly regenerated section of the desiccant wheel comes into contact with the first air stream before rotating into contact with the process portion of the second air stream.

9. The dehumidification system of claim 4, wherein the desiccant wheel unit comprises a desiccant wheel rotatably mounted within a cassette cabinet, the cassette cabinet being partitioned into three sections to define a regeneration inlet, a first process inlet, and a second process inlet, wherein the first air stream is routed through the first process inlet and the second air stream is routed through the regeneration inlet and then through second process inlet.

10. The dehumidification system of claim 9, wherein the desiccant wheel is configured to rotate in a first direction within the cassette cabinet such that a section of the desiccant wheel cycles successively past the regeneration inlet, the first process inlet, and then the second process inlet.

11. The dehumidification system of claim 10, further comprising a second cooling means positioned in the bypass passageway.

12. The dehumidification system of claim 11, further comprising an enthalpy wheel positioned within the bypass passageway upstream of the second cooling means.

13. A dehumidification system, comprising:
 a. an enclosure having a bypass plenum, a heating plenum, a cooling plenum, and a supply plenum, wherein the heating plenum, the cooling plenum, and the supply plenum are in fluid communication with one another, and wherein the bypass plenum and the supply plenum are in fluid communication with one another;
 b. a heating means positioned within the heating plenum;
 c. a cooling means positioned within the cooling plenum;
 d. a desiccant wheel having: i) a regeneration side positioned between the heating plenum and the cooling plenum; and ii) a process side defining a first portion and a second portion, wherein the first portion is positioned between the bypass plenum and the supply plenum and the second portion is positioned between the cooling plenum and the supply plenum.

14. The dehumidification system of claim 13, wherein the heating means is a condenser and the cooling means is an evaporator coil.

* * * * *